(12) United States Patent
Alasia et al.

(10) Patent No.: US 6,983,048 B2
(45) Date of Patent: Jan. 3, 2006

(54) MULTI-SECTION DECODING LENS

(75) Inventors: Alfred V. Alasia, Lake Worth, FL (US); Thomas C. Alasia, Lake Worth, FL (US); Alfred J. Alasia, Royal Palm Beach, FL (US)

(73) Assignee: Graphic Security Systems Corporation, Lake Worth, FL (US)

( * ) Notice: Subject to any disclaimer, the term of this patent is extended or adjusted under 35 U.S.C. 154(b) by 409 days.

(21) Appl. No.: 10/165,162

(22) Filed: Jun. 6, 2002

(65) Prior Publication Data

US 2003/0228014 A1    Dec. 11, 2003

(51) Int. Cl.
  *G09C 1/04*    (2006.01)

(52) U.S. Cl. .............................. 380/54; 380/51; 380/55
(58) Field of Classification Search ................. 380/43, 380/51, 54, 55, 59; 283/17; 355/52; 359/455, 359/619, 621
See application file for complete search history.

(56) References Cited

U.S. PATENT DOCUMENTS

| | | | | |
|---|---|---|---|---|
| 5,708,717 A | * | 1/1998 | Alasia | 380/51 |
| 6,104,812 A | | 8/2000 | Koltai et al. | 380/51 |
| 6,381,071 B1 | * | 4/2002 | Dona et al. | 359/621 |

FOREIGN PATENT DOCUMENTS

| | | |
|---|---|---|
| EP | 1 147912 A2 | 10/1997 |
| WO | WO 92/04692 A1 | 9/1991 |

* cited by examiner

*Primary Examiner*—Justin T. Darrow
(74) *Attorney, Agent, or Firm*—Hunton & Williams LLP

(57) ABSTRACT

The present invention is a multi-section lens for decoding at least two encodings, as a function of the parameters of a lens section, of at least one latent image, as implemented by a software program on a computer system, for security measures such as determining the authenticity of an object. The encoded latent image is a function of distinct lenticular parameters which may include the frequency and lens radius of curvature of a particular lens section. Each section has a corresponding encoded latent image thus allowing for multiple latent images and multiple encodings making it virtually impossible to counterfeit the encoded object or the decoding apparatus.

15 Claims, 2 Drawing Sheets

MULTI-SECTION DECODING LENS

FIELD OF THE INVENTION

This invention relates generally to the field of counterfeit-deterring images and more and specifically to a method and apparatus for producing multiple counterfeit-deterring images separately decodable by a multi-section lens.

BACKGROUND OF THE INVENTION

To prevent unauthorized duplicates or alteration of documents, indicia or a background pattern can be provided. For instance, documents including tickets, checks, passports, banknotes, currency, product labels and the like may be easily counterfeited if counterfeit-deterring images are not employed. The indicia imposed upon a document is typically performed by a printing process such as offset printing, lithography, letterpress or other like mechanical systems or through a variety of photographic methods, by xeroprinting, and a host of other methods. The patterns or indicia may be reproduced with ordinary inks, from special inks which may be magnetic, fluorescent, or the like, from powders which may be baked on, from light sensitive materials such as silver salts or azo dyes, and the like. Most of these patterns placed on sheet materials depend upon complexity and resolution to avoid ready duplication. Consequently, they add an increment of cost to the sheet material without being fully effective in many instances in providing the desired protection from unauthorized duplication or alteration.

Various methods of counterfeit-deterrent strategies have been suggested including Moire-inducing line structures, variable-sized dot patterns, latent images, see-through bars, bar codes, and diffraction based holograms. However, none of these methods employs a true encoded image or the added security benefits derived therefrom.

The instant inventor has been awarded a number of patents on various encoding processes including U.S. Pat. Nos. 3,937,565; 3,524,395; 4,092,654; 4,198,147; 4,914,700; and 5,708,717 the contents of which are herein incorporated by reference. U.S. Pat. No. 5,708,717 discloses a system and method for a Digital Anti-counterfeiting Software Method and Apparatus wherein a latent image was placed onto a source image implemented by a computer software program, such that the latent image is only visible when viewed through a special decoder lens. These principles and embodiments are hereby incorporated by reference.

The greater the frequency the greater the complexity of the encoding and thus the greater the difficulty in counterfeiting a product that has been encoded utilizing the inventor's technology. However, it has been found that the use of images encoded by multiple frequencies making them readable by different lens or a combination thereof has produced a new and unique level of encoding. Accordingly, what is needed in the art is a method and apparatus for producing multiple counterfeit-deterring images that can be decoded individually or together by a lens having multiple active decoding sections or layers, or by use of a combination of lenses. The multiple images provide an increasingly complex encoding of latent images for enhancing security.

The instant invention includes a lens having at least two active decoding sections wherein, each section may have a unique frequency based upon the curvature of that lens. For the purposes of this invention, a lens is defined as any device capable of altering the character of transmitted or reflected light, in accordance with specifically defined parameters, e.g. lenticular parameters. The anti-counterfeiting software will be used to match the lens parameters thereby providing an encoding of a latent image or images(s) at least once, each encoding being a function of the parameters of a section of the decoding lens having specific frequency and/or lens curvature parameters. The angle of the curvature further permits a lower frequency, but when coupled to the double encoding, results in an increased complexity to the encoded latent image. Further, by modifying the curvature, the thickness of the lens corresponding to a particular frequency can be modified providing a paper thin lens. Thus, in one embodiment the latent images can only be viewed through a multi-section lens decoder having a section with parameters that corresponds to each encoding. In another embodiment different latent images found within the same image, can be decoded by use of multiple lenses allowing different levels of security. As a result, the inventor has significantly enhanced the anti-counterfeiting aspect of his invention.

SUMMARY OF THE INVENTION

The present invention provides a software method and apparatus for digitally encoding and incorporating latent images having differing frequency readings into a source image, and a lens having at least two sections adapted to recognize distinct parameters, e.g. frequencies, for decoding of the latent images. The latent images, as implemented by a computer software program, are placed into a rasterized source image such that the latent images are then readable only when viewed through the multi-section lens decoder with particularly modified parameters. Thus, each encoding is a function of the particular parameters, for example lenticular parameters such as the frequency and curvature of a particular lens section.

One or more latent images, in digitalized form, can be encoded at least once for decoding by a variety of lenticular lenses as selected by the user, with each lens having different optical properties such as different line densities per inch and/or different radius of curvature for the lenticular. The properties of the encoded latent images are dependent upon the parameters of the decoding lens. Thus, one latent image twice encoded may include a first encoding dependent upon the frequency and curvature radius of a first lens section and a second encoded image may be based upon the corresponding parameters of a second lens section. In another embodiment, two or more latent images may be encoded into a source image with each latent image being related to a lenticular parameters of two or more separate lenses or sections thereof.

The curvature of the lenticular is modified such that the frequency or lines per inch can be lowered but comparable to high densities without the modified curvature. The inventor has further intensified the complexity of the latent image by having two or more encodings of the same or different images. This requires a multi-section lens, one section per encoding. In one embodiment, the resulting lens may be a relatively thick lens capable of decoding complex latent images, or a lens containing a plurality of sections, each having particular and distinct lenticular parameters. Different degrees of encoding might also be selected wherein the latent image is divided up into a higher multiplicity of lines or elements. Again, for decoding purposes, the multiplicity of elements would be a function of the lens density and/or curvature.

When a latent image(s) is encoded for use with the instant lens, a source image is rasterized, or divided up into a series of lines equal in number to the lines making up the encoded latent images. Generally, when hard copy images are printed, the image is made up of a series of "printers dots" which vary in density according to the colors found in the various component parts of the image. A proprietary software program takes the rasterized lines of the source image and reforms them into the same general pattern as the lines of the encoded latent images. As a result, where the source image is darker, the encoded lines are formed proportionately thicker and similarly where the source image is lighter, the encoded lines are formed proportionately thinner. The subsequent combined image appears to the naked eye to be simply the original source image. However, since the component rasterized lines are formed in the coded pattern of the encoded latent image(s), a double lens decoder will reveal the underlying latent image(s). Due to the high resolution needed for the complex encoded lines, attempts to decode the printed image by other lens or otherwise are generally unsuccessful in reproducing the underlying multi-encoded latent image(s).

As a result of multi-section lenses, several latent images, each corresponding to the parameters of a section of the lens, can be encoded and then reformed into the rasterized source image. Alternatively, the same latent image can be encoded two or more times to correspond to the parameters of the various sections of the lens and then reformed into the rasterized source image. This is achieved by dividing the rasterized lines into the appropriate number of images (or phases) and interlacing the phased images in each raster line element. Each individual latent image might be oriented at any angle and encoded to a different degree, so long as the encoding of each image is a functional multiple of the known decoder frequency and curvature. Alternatively, the grey scale source image might be divided up into primary component printing colors (e.g. cyan, magenta, yellow, and black, or CMYK; red, green, blue, or RGB). Single color bitmap formats might also be used for certain applications. An encoded latent image, or a multi-phased image, could then be individually reformed into each component color. Upon rejoining of the colors to form the final source image, the decoder will reveal the different latent images hidden in the different color segments.

The decoder includes at least two active decoding areas which may define any combination of frequencies, radius of curvatures, or angles between the frequencies, and may define two or more sections.

Useful applications might include the latent encoding of a person's signature inside a source image consisting of that person's photograph. Such a technique would make it virtually impossible to produce fake ID's or driver's licenses through the common technique of replacing an existing picture with a false one. Other vital information besides the person's signature (e.g. height, weight, identification number, etc.) might also be included in the latent image for encoding into the source image.

Still other useful applications might include, but are not limited to the following: credit cards, passports, photo-identification cards, currency, special event tickets, stocks and bond certificates, bank and travelers checks, anti-counterfeiting labels (e.g. for designer clothes, drugs, liquors, video tapes, audio CD's, cosmetics, machine parts, and pharmaceuticals), tax and postage stamps, birth certificates, vehicle restoration cards, land deed titles, and visas.

In any of the above examples, the same latent image may be encoded two or more times at different frequencies, different curvatures, or different angles or two or more latent images may be encoded at the same frequency and curvature but with different angles or with different frequencies and curvatures and different angles. The criteria is that the encoded images be a function of the parameters of the multi-sectioned decoder such that each section's properties have a corresponding encoded latent image.

Accordingly, it is an objective of the instant invention to disclose a multi-layer or multi-sectioned lens for decoding at least two encodings of at least one latent image rasterized into a source image, each layer or section of the lens having the ability to render visible a corresponding encoded image that is a function of the parameters of that section.

Another objective of the present invention is to disclose a multi-sectioned lens for decoding a corresponding encoded latent image which is matched to the frequency and curvature of each lens section, as implemented by a software program on a computer system, typically in printed form.

Still another object of the present invention is to disclose a multi-section lens for decoding at least two encodings based upon the parameters of distinct lens sections of at least one latent image, as implemented by a software program on a computer system, wherein the source image is converted into a grey scale image for incorporation of a latent encoded image.

A related objective of the present invention is to disclose a multi-section lens for decoding at least two encodings based upon the parameters of distinct lens sections of at least one latent image, as implemented by a software program on a computer system, wherein the grey scale source image is further separated out into its color parts for possible incorporation of latent encoded images into each component color part, with the parts being rejoined to form the final encoded source image.

A related objective of the present invention is to disclose a multi-section lens for decoding at least two encodings based upon the parameters of distinct individual lens sections of at least one latent image, as implemented by a software program on a computer system, wherein the elemental lines of the encoded image may be rotated or flipped about their axis as necessary, or as selected by the user.

A further objective of the present invention is to disclose a multi-section lens for decoding at least two encodings based upon the parameters of distinct lens sections of at least one latent image, as implemented by a software program on a computer system, wherein the "single phased" encoded image consists of a first latent image which has been sliced and encoded as a function of a user selected decoder density and encoding factor.

Yet another objective of the present invention is to disclose a multi-section lens for decoding at least two encodings based upon the parameters of distinct lens sections of at least one latent image, as implemented by a software program on a computer system, wherein the "two phased" encoded image is sliced as a function of a user selected decoder density, and each slice is halved into two sub-slices, and the first and second latent images are alternately interlaced in the sub-slices, with each latent image encoded by a user selected encoding factor.

Still another objective of the present invention is to disclose a multi-section lens for decoding at least two encodings based upon the parameters of distinct lens sections of at least one latent image, as implemented by a software program on a computer system, wherein the "three phased" encoded image is sliced as a function of a user selected decoder density, and each slice is divided into three sub-slices, and the first, second, and third latent images are alternately interlaced in the sub-slices, with each latent image encoded by a user selected encoding factor.

Yet another objective of the present invention is to disclose a multi-section lens for decoding at least two encodings based upon the parameters of distinct lens sections of at least one latent image, as implemented by a software program on a computer system, wherein an "indicia tint" is produced which is similar to a two phased encoded image, but with one source file, and every second sub-slice of the input image is the complement of the first sub-slice.

A further objective of the present invention is to disclose a multi-section lens for decoding at least two encodings based upon the parameters of distinct lens sections of at least one latent image, as implemented by a software program on a computer system, wherein the source image consists of a solid color or tint pattern with the encoded image incorporated therein, but the elemental lines are flipped only where a letter or object occurs in underlying latent image.

Still another objective of the present invention is to disclose a multi-section lens for decoding at least two encodings based-upon the parameters of distinct lens sections of at least one latent image, as implemented by a software program on a computer system, wherein the latent image is encoded directly into a certain visible figure on the source image, thus creating a "hidden image" effect.

Yet another objective of the present invention is to disclose a multi-section lens for decoding at least two encodings based upon the parameters of distinct lens sections of at least one latent image, as implemented by a software program on a computer system, wherein a bitmap source image is used (instead of a grey scale image) to create hidden images behind single color source images or sections of source images.

Still another related objective of the present invention is to disclose a multi-section lens for decoding at least two encodings based upon the parameters of distinct lens sections of at least one latent image, as implemented by a software program on a computer system, wherein a multi-level, 3-dimensional relief effect is decoded by decoding different encoding parameters corresponding to the parameters of each section.

Still another possible objective of the present invention is to disclose a decoder lens having holographic images produced through line diffraction techniques for indicating authenticity of the lens.

Other objectives and advantages of this invention will become apparent from the following description taken in conjunction with the accompanying drawings wherein are set forth, by way of illustration and example, certain embodiments of this invention. The drawings constitute a part of this specification and include exemplary embodiments of the present invention and illustrate various objects and features thereof.

DETAILED DESCRIPTION OF THE PREFERRED EMBODIMENT

Although the invention will be described in terms a specific embodiment with certain alternatives, it will be readily apparent to those skilled in this art that various modifications, rearrangements and substitutions can be made without departing from the spirit of the invention. The scope of the invention is defined by the claims appended hereto.

How an object is viewed under a lens depends on the lens' focal length and radius of curvature. As light passes through a lens it undergoes two refractions. Refraction or bending of light occurs as light passes from one medium to another when there is a difference in the index of refraction between the two materials. At the first surface, as the light enters the lens, it passes from air into the plastic or glass. Then the light travels through the lens. At the other side of the lens, the light again refracts as it goes from the lens to air. The surface of the lens may be curved in such a manner as to direct the light in a certain direction. Within the lens itself there may be modifications in the curvature to further refract the light.

Figure 1:
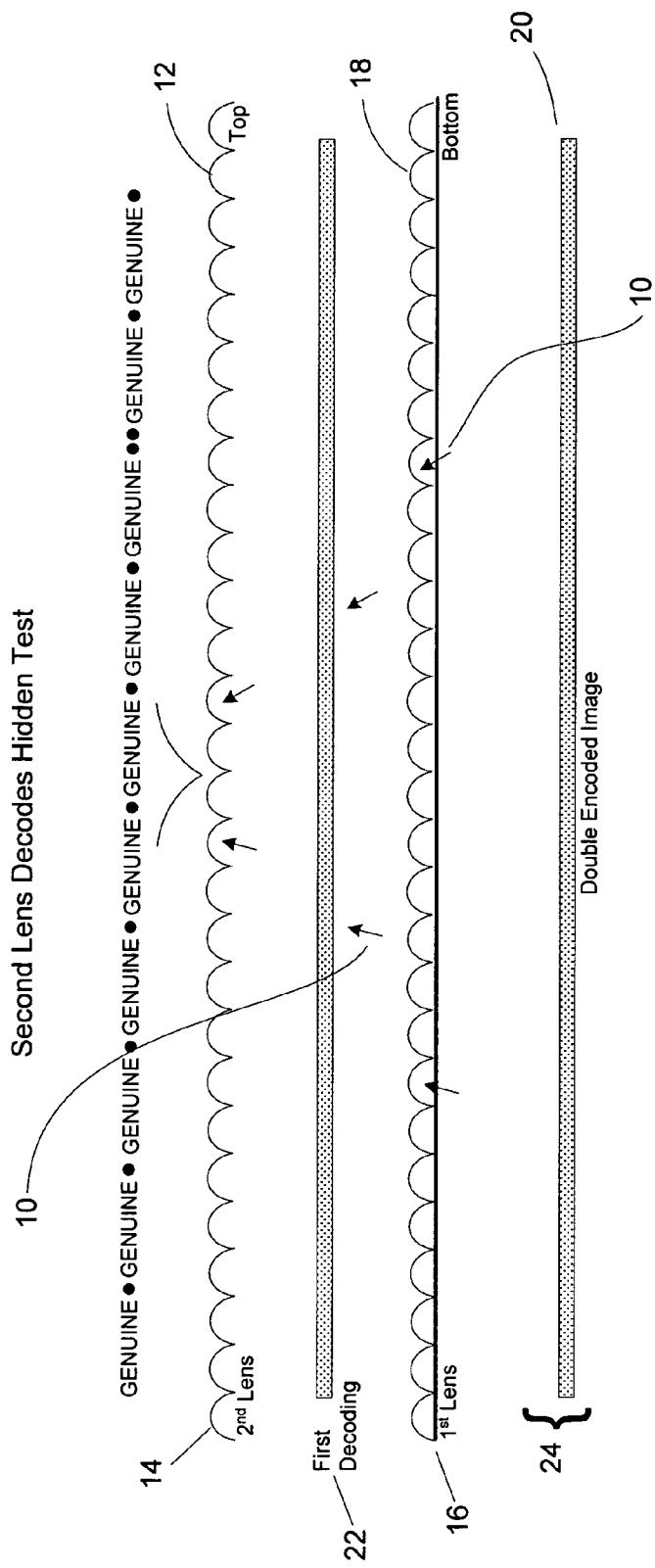
FIG. 1 shows a cross section of a horizontal view of the multi-section decoding lens and FIG. 2 shows the corrected lenticular of a first and second section of the multi-section decoding lens.

Now referring to FIG. 1, shown is cross section of a horizontal view of the multi-section decoding lens. A ray of light (10) enters a curvature (12) of a second lens (14). The curvature (12) has been modified to refract the light (10) to a predetermined angle. Thus, the light is redirected in a specific manner to decode a correlated second latent encoded image (22) embedded in a rasterized source image in an object (24). The light (10) then passes to a first lens (16) with a different radius of curvature (18) that refracts the light (10) a second time. The light (10) passing through the first lens (14) decodes a correlated first latent encoded image (20) imbedded in a rasterized source image in a document (24).

The inventor has discovered that by modifying the radius of curvature, a lower frequency may be employed. The modified curvature coupled with such double encoding generates an increased complexity to the encoded latent image. Further, by modifying the curvature, the thickness of the lens corresponding to a particular frequency can be increased by three. As a result, a lower frequency can be employed but the decoding lens remains dense and thus of practical use for decoding increasingly complex encoded latent images. Further, by utilizing multi-sectioned lenses and thus multi-encoding, the complexity of the encoded latent images is significantly enhanced making counterfeiting of an object and reproduction of the multi-section decoding lens increasingly untenable.

Figure 2:
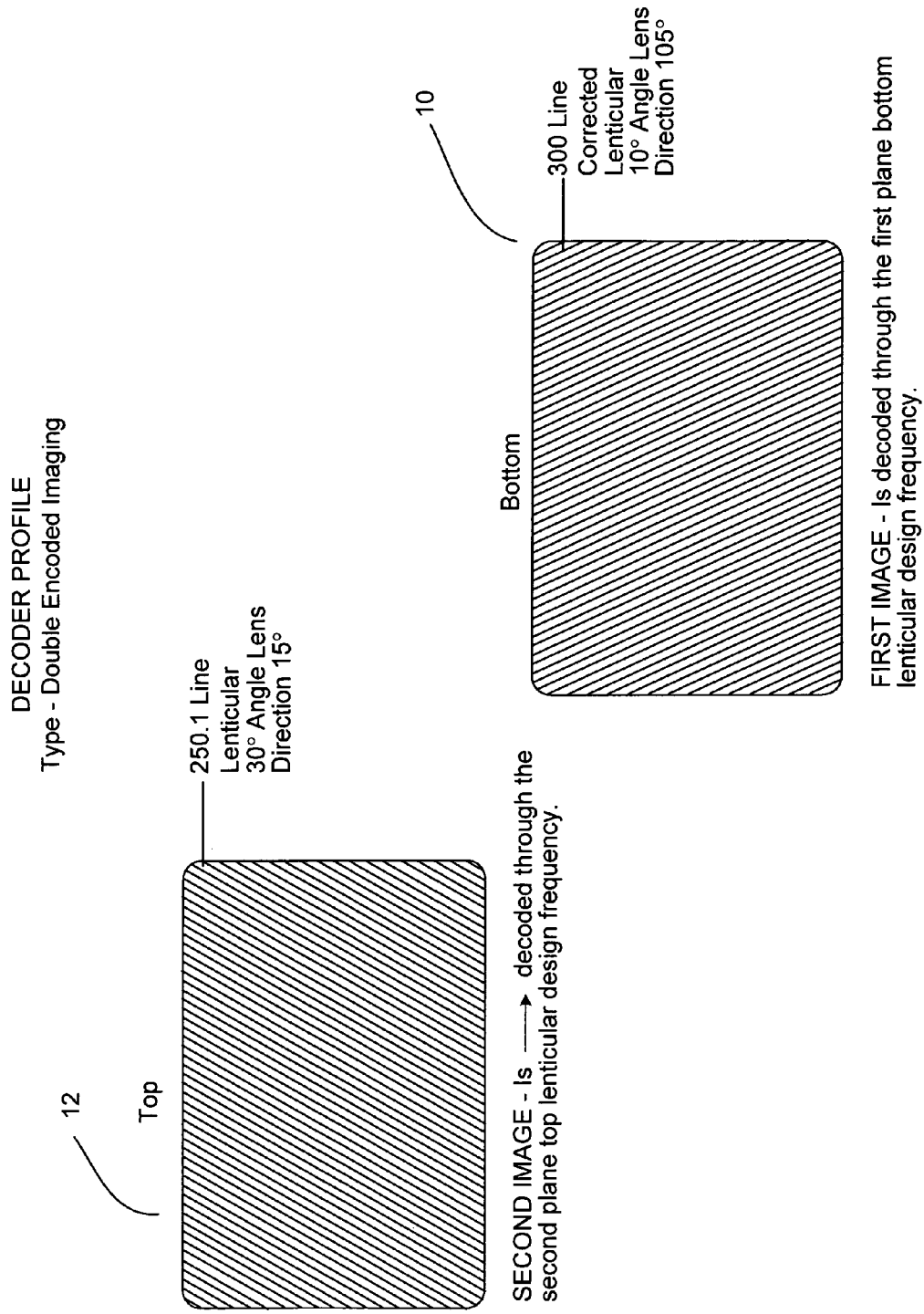

Now referring to FIG. 2, shown is a corrected lenticular of a first and second section of a multi-section decoding lens. The first section (10), the bottom section, shows a 300 line corrected lenticular 10 degree angle lens with a direction of 105 degrees. The modifiable parameters of a section are its frequency and curvature. Thus, the frequency of the lens is 300 lines per inch and the curvature is 10 degrees causing the light to be directed 105 degrees. The second section (12), the top section, shows a 250.1 line lenticular 30 degree angle lens with a direction of 15 degrees. The inventor's software program will scramble a latent image and then embed that latent image into a rasterized source image. The program will correlate the first encoding of the latent image to correspond to the parameters of the first lens and the second latent image to correspond to the parameters of the second lens. Thus, the encoding of the latent image is a function of the frequency and curvature of a particular lens. The software can be programed to scramble the same latent image at least twice or to scramble different images. The double encoding permits an elevated level of security not previously available making counterfeiting of objects incorporating this invention much more arduous. Further, reproduction of the multi-section lens decoder would require knowledge of the radius of curvature and frequency for all sections, a formidable task which renders such reproduction problematic.

An expected application of the present invention is where multi-levels of security are needed. For example, a company will issue a standard decoder lens to all employees. The first section of the multi-section lens will allow an employee access to all minimum security areas. Employees with authority to enter maximum security areas would have a second section with parameters different than those of the first section allowing a second latent image to be decoded whereas those without authority would have a second section with the same parameters as the first section and the second image could not be decoded. Thus, to gain entrance to maximum security, the authorized employee must have a decoder capable of unencoding both latent images. The decoder may contain the employees signature or picture to prevent unauthorized use. Additionally, a hologram may be imprinted in the decoding lens for visual verification of the authenticity of the decoder itself.

The Encoded Indicia process involves rasterizing, or dividing up into lines, a source or visible image according to the frequency (or density) of a lenticular decoder lens. The number of lines is also a function of the encoding factor, or zoom factor, as applied to a latent or secondary image. After the latent image is processed and encoded, a set of encoded lines exists which can then be combined into the rasterized lines of the visible image. The visible image is thus reformed, or re-rasterized, according to the pattern of the encoded latent image lines. Where the visible image is darker, the encoded lines are made proportionately thicker in re-forming the rasterized lines of the visible image; similarly, where the visible image is lighter, the encoded lines are made proportionately thinner. As a result, a new visible image is created, but with the encoded, latent, pattern being visible "underneath" when viewed through a transparent decoder lens.

As for lens density, the inventor has assigned reference names to lenses with various frequencies (or line densities per inch), including for instance, the following: D-7X with 177 lines/inch; D-7 with 152.5 lines/inch; D-6 with 134 lines/inch; D-9 with 69 lines/inch. (See reference 6). The software for performing this process also provides an "×2" (or doubling factor, df) option which doubles the effective line density, and hence divides the output image up into twice as many slices. The resulting image will still be decodable by the selected lens because the number of lines is an even multiple of the frequency of the lens.

The output image slice, having width h, is processed as a function of the input slice width i (see reference 8). In turn, width i is a function of width h, the lens density, and a base code factor (or encoding factor) as selected by the user.

These formulas are as follows:
df=2 (if "×2" selected); 1 (by default)
o=h*density/100 (See reference 10)
i=o*base code(B) (See reference 8)

Rearranging these formulas, the value for h becomes:

$$h = \frac{(1/B)*100}{Density*df}$$

Hence, as the value for the base code and/or the density is increased, the width h will decrease. A larger base code, or encoding factor, therefore creates more lines and results in a more distorted or encoded image.

This effect will allow the latent image to be visible only when viewed through a decoder. Additionally, the latent image might consist of a one, two, or three multi-phased images as created using previous interface screens for multi-phased images and saved in an appropriate file.

inventor refers to this technique as Encoded Micro Lines.

All patents and publications mentioned in this specification are indicative of the levels of those skilled in the art to which the invention pertains. All patents and publications are herein incorporated by reference to the same extent as if each individual publication was specifically and individually indicated to be incorporated by reference.

One skilled in the art will readily appreciate that the present invention is well adapted to carry out the objectives and obtain the ends and advantages mentioned, as well as those inherent therein. The methods, procedures and techniques described herein are presently representative of the preferred embodiments, are intended to be exemplary and are not intended as limitations on the scope. Changes therein and other uses will occur to those skilled in the art which are encompassed within the spirit of the invention and are defined by the scope of the appended claims. Although the invention has been described in connection with specific preferred embodiments, it should be understood that the invention as claimed should not be unduly limited to such specific embodiments. Indeed, various modifications of the described modes for carrying out the invention which are obvious to those skilled in the art are intended to be within the scope of the following claims.

What is claimed is:

1. An authenticity verification apparatus comprising;
   a lens including at least a first section and a second section, each said section containing distinct lenticular parameters,
   said first section being constructed and arranged for decoding a first encoded latent image;
   said second section being constructed and arranged for decoding a second encoded latent image;
   whereby the authenticity of an object containing plural latent images, each defined by a distinct set of lenticular parameters, may be verified.

2. The apparatus of claim 1 wherein each set of distinct parameters include frequency and radius of curvature of a lens section.

3. The apparatus of claim 1 wherein said encoded latent images are embedded in a rasterized source image.

4. The apparatus of claim 1 wherein said parameters of said at least first and said second sections are identical.

5. The apparatus of claim 1 wherein said parameters of said at least first and said second sections are dissimilar.

6. The apparatus of claim 1 wherein said at least first and said second latent images are the same image.

7. The apparatus of claim 1 wherein said apparatus has at least three lens sections, each said section being defined by a distinct set of lenticular parameters.

8. The apparatus of claim 1 wherein a hologram is embedded into said lens of said apparatus.

9. A method for authenticating an object containing encoded images comprising;
   selecting at least a first set of distinct lenticular parameters;
   selecting at least a second set of distinct lenticular parameters;
   creating a multi-section decoding lens by incorporating said at least a first set of parameters within a first section of said lens and incorporating said at least a second set of parameters within a second section of said lens;

inputting each said set of parameters into a software program;
encoding, via said software program, at least a first latent image as a function of said parameters of said first lens section;
encoding, via said software program, at least a second latent image as a function of said parameters of said second lens section;
rasterizing, via said software program, a source image; combining, via said software program, said at least first and said second encoded latent images with said rasterized source image; encoding an object by imprinting said latent images within said source image onto said object; and verifying authenticity of said object by decoding said at least first and said second latent images with said multi-section decoding lens.

10. The method of claim 9 wherein each set of distinct parameters include a particular frequency and radius of curvature of a lens section.

11. The method of claim 9 wherein said parameters of said at least first and said second lens section are identical.

12. The method of claim 9 wherein said parameters of said at least first and said second lens section are dissimilar.

13. The method of claim 9 wherein said at least first and said second latent images are the same image.

14. The method of claim 9 wherein said at least first and said second latent image are different images.

15. The method of claim 9 wherein said multi-section decoding lens has at least three lens sections, said sections each having a particular set of distinct lenticular parameters.

* * * * *